United States Patent
Aiba et al.

(10) Patent No.: US 12,481,359 B2
(45) Date of Patent: Nov. 25, 2025

(54) RECOMMENDATION DEVICE

(71) Applicant: NTT DOCOMO, INC., Tokyo (JP)

(72) Inventors: Kunihiro Aiba, Chiyoda-ku (JP); Sohei Ono, Chiyoda-ku (JP); Wataru Akashi, Chiyoda-ku (JP); Sho Maeoki, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/712,778

(22) PCT Filed: Oct. 5, 2022

(86) PCT No.: PCT/JP2022/037344
§ 371 (c)(1),
(2) Date: May 23, 2024

(87) PCT Pub. No.: WO2023/095456
PCT Pub. Date: Jun. 1, 2023

(65) Prior Publication Data
US 2025/0021158 A1    Jan. 16, 2025

(30) Foreign Application Priority Data

Nov. 29, 2021 (JP) ................................. 2021-192950

(51) Int. Cl.
*G06F 3/01* (2006.01)
*G06Q 30/0601* (2023.01)

(52) U.S. Cl.
CPC ......... *G06F 3/013* (2013.01); *G06Q 30/0631* (2013.01)

(58) Field of Classification Search
CPC ........................... G06Q 30/0631; G06F 3/013
See application file for complete search history.

(56) References Cited

U.S. PATENT DOCUMENTS

| | | | |
|---|---|---|---|
| 2013/0124344 A1* | 5/2013 | Kolluri | G06Q 30/0241 705/14.73 |
| 2016/0209919 A1* | 7/2016 | Kawana | G06V 20/20 |
| 2020/0241824 A1* | 7/2020 | Lee | G06F 3/013 |

FOREIGN PATENT DOCUMENTS

JP    2019-192072 A    10/2019

OTHER PUBLICATIONS

International Search Report mailed on Dec. 6, 2022 in PCT/JP2022/037344 filed on Oct. 5, 2022.
Combined International Preliminary Report on Patentability and Written Opinion mailed Jun. 13, 2024 in corresponding International Application No. PCT/JP2022/037344 (English translation only), 5 pages.

* cited by examiner

*Primary Examiner* — Robin J Mishler
(74) *Attorney, Agent, or Firm* — Oblon, McClelland, Maier & Neustadt, L.L.P.

(57) ABSTRACT

A recommendation device includes an acquisition unit acquiring a visual line image obtained by imaging the trajectory of the visual line of a user browsing a content displayed on a user terminal, an extraction unit extracting a feature vector indicating a feature amount of the visual line image, a generation unit generating a correspondence relationship between the content and the trajectory of the visual line of the user as a user context on the basis of the feature vector, a computation unit computing the score of each of a plurality of contents, which are recommendation candidates, by using the user context, and an output unit outputting a recommendation result of a content selected on the basis of the score.

4 Claims, 9 Drawing Sheets

RECOMMENDATION DEVICE

TECHNICAL FIELD

One aspect of the present disclosure relates to a recommendation device recommending a content to a user.

BACKGROUND ART

In online shopping or the like, a recommendation system recommending a product or the like according to a user is known. Such a recommendation system, for example, extracts information relevant to the interest of the user by using a log or the like of the click or the page transition of the user according to the selection of the product. Then, the recommendation system sorts the product by using the information relevant to the interest of the user, and recommends the sorted product to the user.

Patent Literature 1 discloses a recommendation device in which an image including the face is presented to a user, a bias in the visual line of the user in the image is calculated on the basis of visual line information relevant to the motion of the visual line of the user, and recommendation information determined on the basis of the bias in the visual line is presented to the user.

CITATION LIST

Patent Literature

Patent Literature 1: Japanese Unexamined Patent Publication No. 2019-192072

SUMMARY OF INVENTION

Technical Problem

The log or the like of the click or the page transition of the user according to the selection of the product can be affected by an erroneous manipulation or the like. Accordingly, it may not be possible to recommend a content on which the preference of the user is sufficiently reflected on the basis of such information. In addition, in an algorithm for performing a recommendation simply by using the motion of the visual line as described in Patent Literature 1, for example, in a case where the motion of the visual line is different for each of the products as in the online shopping, it is difficult to determine what the user has been watching, and accordingly, it is not possible to suitably determine the preference of the user, and it may not be possible to recommend the content on which the preference of the user is sufficiently reflected.

Therefore, an object of one aspect of the present disclosure is to provide a recommendation device capable of recommending a content matching the preference of a user.

Solution to Problem

A recommendation device according to one aspect of the present disclosure includes: an acquisition unit acquiring a visual line image obtained by imaging a trajectory of a visual line of a user browsing a content displayed on a user terminal; an extraction unit extracting a feature vector indicating a feature amount of the visual line image; a generation unit generating a correspondence relationship between the content and the trajectory of the visual line of the user as a user context on the basis of the feature vector; a computation unit computing a score of each of a plurality of contents, which are recommendation candidates, by using the user context; and an output unit outputting a recommendation result of a content selected on the basis of the score.

In the recommendation device according to one aspect of the present disclosure, the feature vector indicating the feature amount of the trajectory of the visual line of the user browsing the content is extracted by featurizing the visual line image. Then, the correspondence relationship between the content and the trajectory of the visual line of the user is generated as the user context on the basis of the feature vector. Further, the score of each of the contents is computed on the basis of such a user context, and the recommendation result is output. By imaging the trajectory of the visual line and computing the score of each of the contents without determining what the user has been watching (for example, which information such as a price or product details, which is the information of the content, the user has been watching), it is possible to abstractively grasp the preference of the user on the basis of a behavior. According to such a method for grasping the preference, it is not necessary to determine the preference of the user relevant to the information of the content (for example, the price, the product details, and the like) by determining what the user has been watching. Then, the content according to the trajectory of the visual line of the user can be selected in accordance with the score based on the visual line image. As a result thereof, it is possible to recommend the content matching the preference of the user.

Advantageous Effects of Invention

According to one aspect of the present disclosure, it is possible to provide the recommendation device capable of recommending the content matching the preference of the user by suitably grasping the preference of each of the users.

DESCRIPTION OF EMBODIMENTS

Figure 1:
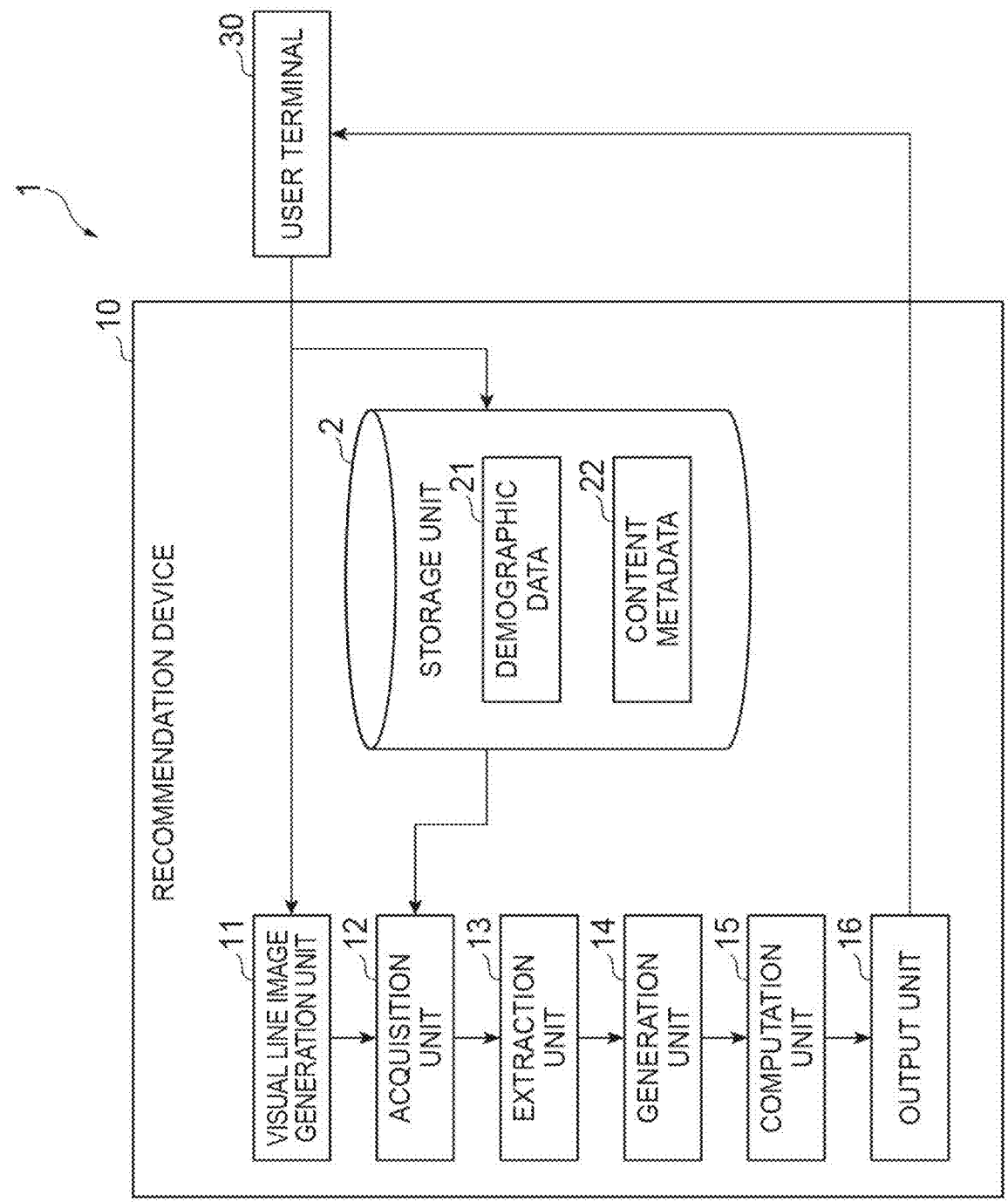
FIG. 1 is a diagram illustrating a function configuration of a recommendation device according to an embodiment.

Hereinafter, an embodiment of the present invention will be described in detail with reference to the attached drawings. In the description of the drawings, the same reference numerals will be applied to the same or equivalent elements, and the repeated description will be omitted.

FIG. 1 is a diagram illustrating a function configuration of a recommendation device 10 according to this embodiment. The recommendation device 10 is a device recommending a content according to the preference of each user to the user (that is, distributing the content to a user terminal 30 of the user). The content, for example, indicates any tangible object or intangible object that is traded with a cost or without a cost, and is a concept including the provision of a product and a service. The recommendation device 10 learns the preference of the user on the basis of a visual line image obtained by imaging the trajectory of the visual line of the user browsing the content displayed on the user terminal 30. The recommendation device 10 selects a content to be recommended to the user such that the content according to the preference of the user is a distribution target.

As illustrated in FIG. 1, a recommendation system 1 is configured by including a recommendation device 10 and a user terminal 30. The user terminal 30 is a communication terminal having a communication function, and for example, is a smart phone, a tablet terminal, a personal computer, or the like. The user terminal 30 is connected to the recommendation device 10 via a network such that communication is available. The user terminal 30 has at least a function of displaying various screens, a function of detecting the trajectory of the visual line of the user, a function of transmitting various information pieces to the recommendation device 10, a function of receiving the distribution of the content, which is the recommendation target, from the recommendation device 10, and a function of displaying the content. In FIG. 1, only one user terminal 30 is illustrated, but in practice, the recommendation system 1 includes a plurality of user terminals 30 of each of the users.

For example, the user terminal 30 displays a product details screen for browsing a product, which is the content. In addition, the user terminal 30 detects the trajectory of the visual line of the user browsing the content displayed on the user terminal 30. A method for detecting the trajectory of the visual line is not limited. As an example, the user terminal 30 may detect the trajectory of the viewpoint of the user by using pupil centre corneal reflection (PCCR). In a case where the pupil centre corneal reflection is adopted, the user terminal 30 may include an infrared emitting device and an infrared camera as a hardware configuration.

The user terminal 30 transmits information indicating the detected trajectory of the visual line of the user to the recommendation device 10. In addition, the user terminal 30 may transmit information indicating a purchase record of the user relevant to the content displayed on the user terminal 30 to the recommendation device 10. Further, the user terminal 30 may transmit demographic data of the user to the recommendation device 10. Examples of the demographic data include an age, a gender, a residence, a family configuration, an occupation, and the like, but are not limited thereto. The demographic data, for example, can be represented by a numerical value or an allocated code (such as a gender code, a residence code, a family configuration code, and an occupation code). Further, the user terminal 30 may transmit content metadata of the user to the recommendation device 10. The content metadata is meta-information of a content browsed finally (last) by the user. Examples of the content metadata include a price range, a genre, the presence or absence of a campaign, and the like, but are limited thereto. The content metadata, for example, can be represented by a numerical value or an allocated code (such as a price range code, a genre code, and a campaign code).

Figure 2:
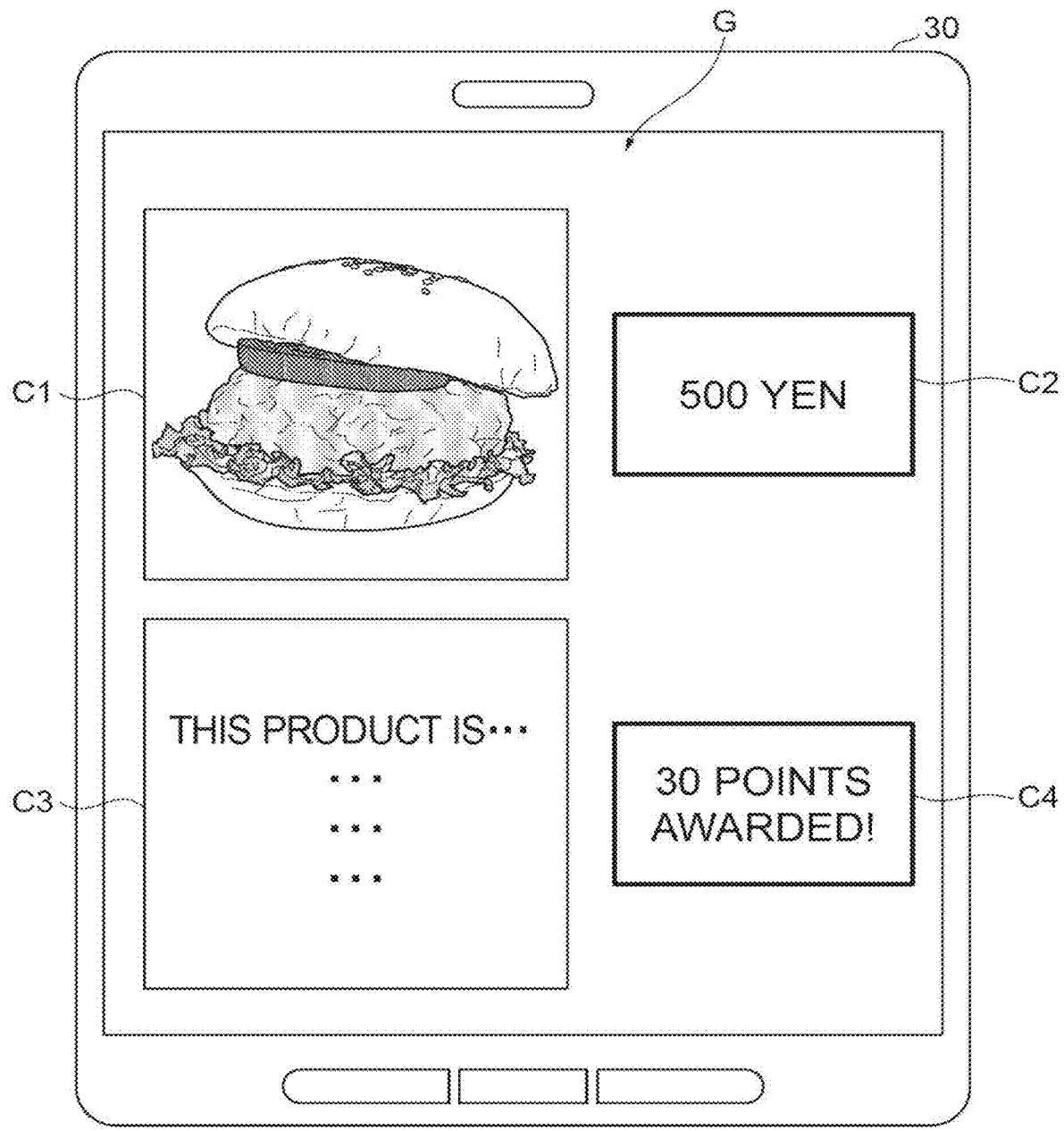
FIG. 2 is a diagram illustrating an example of a product details screen for browsing a product.

FIG. 2 is a diagram illustrating an example of a product details screen G for browsing the product. The product details screen G, for example, is a Web page for online shopping. The product details screen G, for example, may be presented to the user terminal 30 by the recommendation device 10, or may be presented to the user terminal 30 by another external system. On the product details screen G, various information pieces relevant to the content are displayed. In an example, on the product details screen G, a product image C1, a product price C2, a detailed statement C3, and collateral information C4 relevant to a hamburger are displayed.

The user terminal 30, for example, detects the trajectory of the visual line of the user for each access to the product details screen G. In addition, the user terminal 30 may measure a browsing time of the content. The browsing time of the content, for example, may be a display time of the product details screen G.

Figure 3:
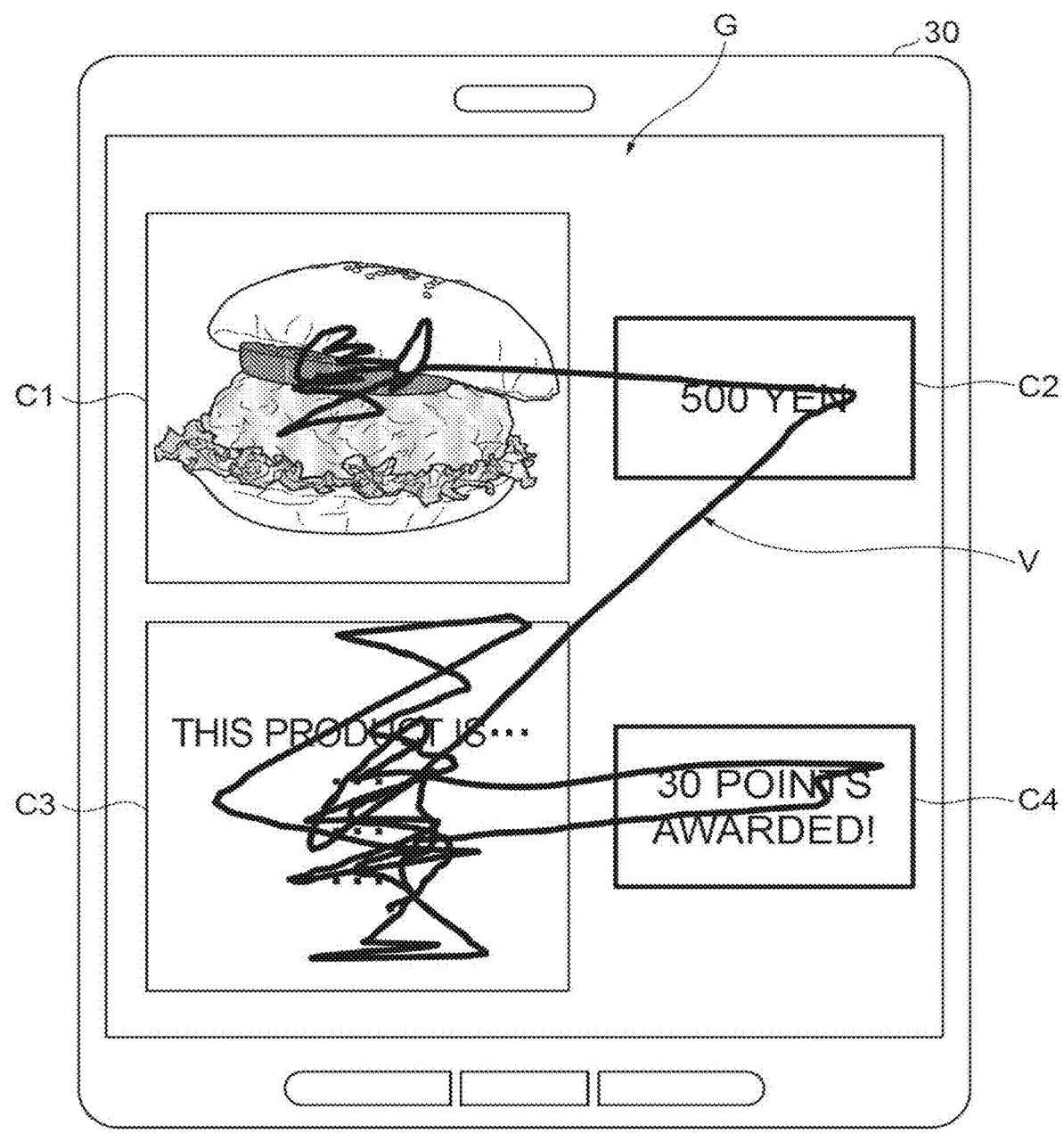
FIG. 3 is a diagram describing an example of a trajectory of a visual line.

FIG. 3 is a diagram illustrating an example of a trajectory V of the visual line. The trajectory V of the visual line is the trajectory of the visual line of the user with respect to the content displayed on the product details screen G. In an example, the trajectory V of the visual line is the trajectory of the visual line of the user with respect to the content detected at the first access to the product details screen G. In FIG. 3, the trajectory V of the visual line is represented by a black solid line. For example, the trajectory V of the visual line indicates that the visual line is moved in the order of the product image C1, the product price C2, the detailed statement C3, the collateral information C4, and the detailed statement C3.

The user terminal 30 transmits information indicating the detected trajectory V of the visual line to the recommendation device 10. The information indicating the trajectory V of the visual line includes the browsing time of the content. The recommendation device 10 receives the information indicating the trajectory V of the visual line.

Returning to FIG. 1, the recommendation device 10 includes a storage unit 2, a visual line image generation unit 11, an acquisition unit 12, an extraction unit 13, a generation unit 14, a computation unit 15, and an output unit 16.

The storage unit 2 stores demographic data 21 and content metadata 22 of each of the users. For example, the recommendation device 10 stores the demographic data and the content metadata of each of the users, which are received from the user terminal 30 of each of the users, in the storage unit 2. The recommendation device 10 may store the information indicating the trajectory of the visual line, which is received from the user terminal 30, and the information indicating the purchase record of the user relevant to the content displayed on the user terminal 30 in the storage unit 2.

The visual line image generation unit 11 generates the visual line image obtained by imaging the trajectory of the visual line of the user. For example, the visual line image generation unit 11, for example, generates the visual line image obtained by imaging the trajectory V of the visual line on the basis of the information indicating the trajectory V of the visual line, which is received from the user terminal 30. The visual line image generation unit 11 outputs the generated visual line image to the acquisition unit 12.

The acquisition unit 12 acquires the visual line image obtained by imaging the trajectory of the visual line of the user browsing the content displayed on the user terminal 30. For example, the acquisition unit 12 acquires the visual line image obtained by imaging the trajectory V of the visual line with the visual line image generation unit 11.

The acquisition unit 12 acquires the browsing time for browsing the content and the demographic data of the user. For example, the acquisition unit 12, for example, acquires the browsing time for which the content is browsed by the user on the basis of the information indicating the trajectory V of the visual line, which is received from the user terminal 30. In addition, the acquisition unit 12 acquires the demographic data of each of the users, which is stored in the storage unit 2.

The extraction unit 13 extracts a feature vector (a visual line vector) indicating a feature amount of the visual line image. For example, the extraction unit 13 generates numerical data obtained by featurizing the visual line image. Then, the extraction unit 13 performs main component analysis with respect to the numerical data to extract a first main component as the visual line vector.

Figure 4:
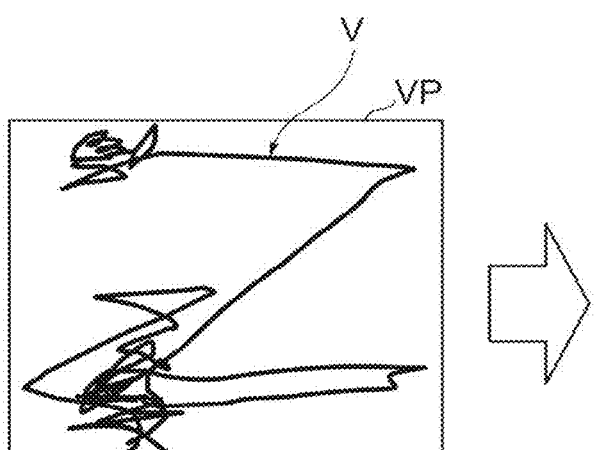
FIG. 4 is a diagram describing an example of a featurized visual line image.

FIG. 4 is a diagram illustrating an example of the featurized visual line image. A visual line image VP illustrated in FIG. 4 is the visual line image obtained by imaging the trajectory V of the visual line. For example, the extraction unit 13 extracts a feature amount of the visual line image VP, and generates two-dimensional or three-dimensional numerical data. As an example, the extraction unit 13 divides the visual line image VP into 6×6 regions, and acquires a feature amount in each of the divided regions. Then, the extraction unit 13 generates numerical data VA in a two-dimensional array including 6 rows×6 columns elements corresponding to the feature amounts in the regions, respectively.

The numerical value of each of the elements of the numerical data VA indicates which part of the content has been viewed by the user for how long. For example, the density of the trajectory V of the visual line in the visual line image VP increases as the numerical value of the element of the numerical data VA increases. In addition, the density of the trajectory V of the visual line in the visual line image VP decreases as the numerical value of the element of the numerical data VA decreases. Here, the numerical value of each of the elements of the numerical data VA does not consider (determine) the position of the information relevant to the content. More specifically, the numerical value of each of the elements of the numerical data VA does not consider (determine) the position of the product image C1, the product price C2, the detailed statement C3, the collateral information C4, and the like on the product details screen G1.

Figure 5:
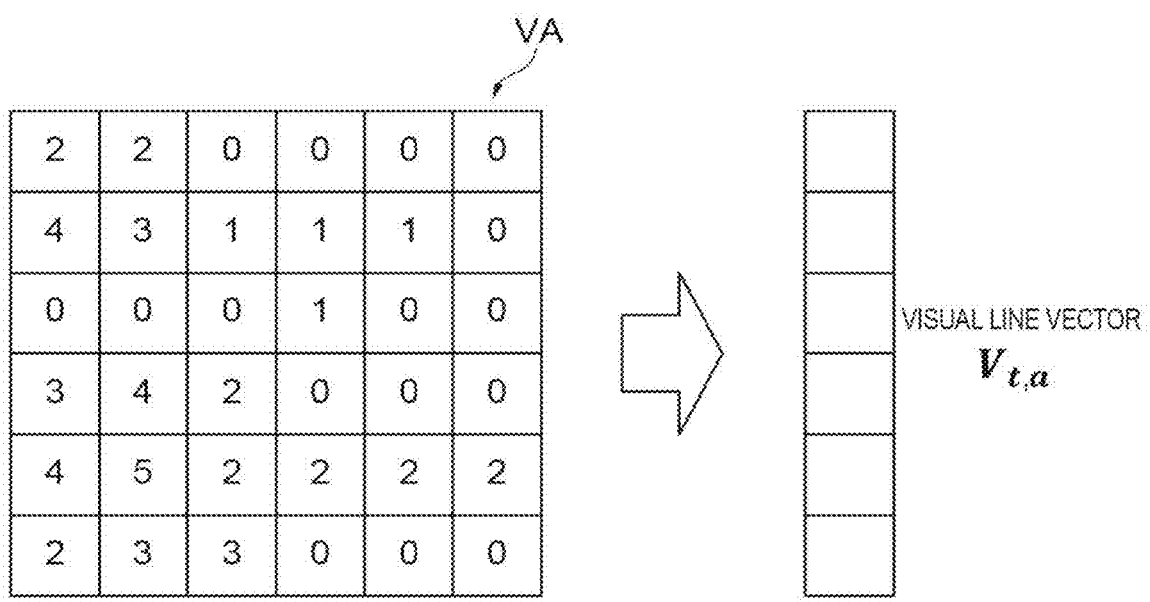
FIG. 5 is a diagram describing extraction of a visual line vector.

FIG. 5 is a diagram illustrating the extraction of the visual line vector. For example, the extraction unit 13 performs the main component analysis with respect to the numerical data VA to extract the first main component as the visual line vector. In an example, the extraction unit 13 extracts the acquired first main component as a visual line vector $V_{t,a}$. Here, t is the number of trials (the number of visits), and a is the content. The visual line vector to be extracted as described above can be different for each trajectory of the visual line of the user, for each visit, or for each content. That is, the visual line vector $V_{t,a}$ can be referred to as a visual line vector "of a certain visit of a certain user with respect to a certain content".

Returning to FIG. 1, the generation unit 14 generates a correspondence relationship between the content and the trajectory of the visual line of the user as a user context on the basis of the visual line vector, which is the feature vector. For example, the generation unit 14 generates the correspondence relationship between the content and the trajectory of the visual line of the user as the user context on the basis of the feature vector, the browsing time, and the demographic data.

Figure 6:
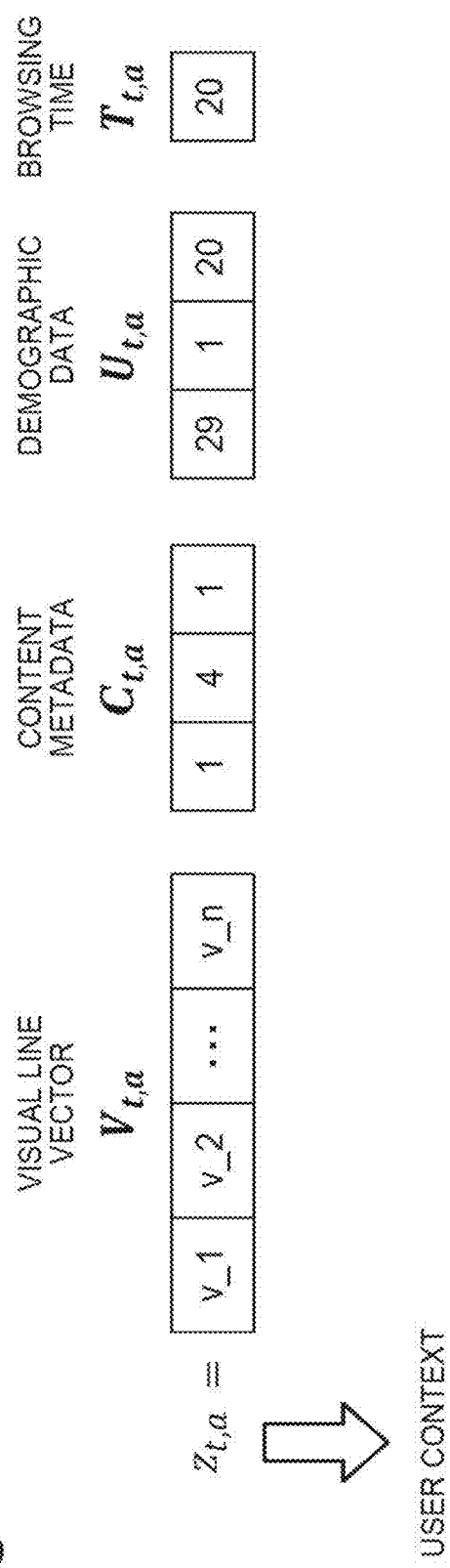
FIG. 6 is a diagram describing generation of a user context.

FIG. 6 is a diagram illustrating the generation of the user context. For example, the acquisition unit 12 further acquires content metadata $C_{t,a}$, demographic data $U_{t,a}$, and a browsing time $T_{t,a}$. t is the number of trials (the number of visits), and a is the content. Then, the generation unit 14 generates a user context $z_{t,a}$ on the basis of the visual line vector $V_{t,a}$, the content metadata $C_{t,a}$, the demographic data $U_{t,a}$, and the browsing time $T_{t,a}$. In an example, the visual line vector $V_{t,a}$ includes [v_1, v_2, . . . , v_n] each indicating the first main component of the feature amount as an element. The content metadata $C_{t,a}$ includes [1, 4, 1] as an element. The elements in the content metadata $C_{t,a}$ indicate a price range code, a genre code, and a campaign code, respectively. The demographic data $U_{t,a}$ includes [29, 1, 20] as an element. The elements in the demographic data $U_{t,a}$ indicate an age, a gender code, a residence code, respectively. The browsing time $T_{t,a}$ includes [20] indicating the number of seconds of the browsing time as an element.

For example, the generation unit 14 generates the user context $z_{t,a}$ by combining the visual line vector $V_{t,a}$, the content metadata $C_{t,a}$, the demographic data $U_{t,a}$, and the browsing time $T_{t,a}$. The generation unit 14 may generate the user context $z_{t,a}$ only on the basis of the visual line vector $V_{t,a}$. The generation unit 14 may generate the user context $z_{t,a}$ on the basis of one or more of the visual line vector $V_{t,a}$, the content metadata $C_{t,a}$, the demographic data $U_{t,a}$, and the browsing time $T_{t,a}$.

Returning to FIG. 1, the computation unit 15 computes the score of each of a plurality of contents, which are recommendation candidates, by using the user context. For example, the computation unit 15 computes a score $p_{t,a}$ of the content by Expression (1) described below to which a contextual bandit algorithm is applied.

[Expression 1]

$$p_{t,a} \leftarrow z_{t,a}\hat{\theta}_u + \alpha\sqrt{s_{t,a}} \qquad (1)$$

Here, t is the number of trials (the number of visits), and a is the content (corresponding to arm in the contextual bandit algorithm). $(\theta_a)\hat{}$ is a term (a utilization term) of which the value is updated by learning the user context to determine which score is desirable to be applied to each of the contents by receiving feedback from past behavior of the user. $\alpha\sqrt{s_{t,a}}$ is a term (a search term) that is updated together with the update of $(\theta_a)\hat{}$ and represents the uncertainty of the score (the degree to be searched) for each of the contents. The number of $(\theta_a)\hat{}$ and the number of $\alpha\sqrt{s_{t,a}}$ correspond to the number of contents. In the contextual bandit algorithm, the score is computed by performing search without using the ground truth data, and the user context is learned in the process of computing the score. The computation unit 15, for example, learns the user context as a "user with such a motion of the visual line for this content". Note that, in a case where the user context includes the content metadata, a model for learning the preference of the "user with such a motion of the visual line by browsing a content with such a feature last" is created.

In the contextual bandit algorithm, ground truth data may be used. For example, the acquisition unit 12 further acquires the ground truth data indicating a record that the user purchases the content displayed on the user terminal. Then, the computation unit 15 learns the user context $z_{t,a}$ by using the ground truth data in the computation of the score.

The output unit 16 outputs a recommendation result of the content selected on the basis of the score. For example, the output unit 16 selects one or a plurality of contents from the plurality of contents in descending order of the score $p_{t,a}$, and transmits the recommendation result of the selected content to the user terminal 30.

Figure 7:
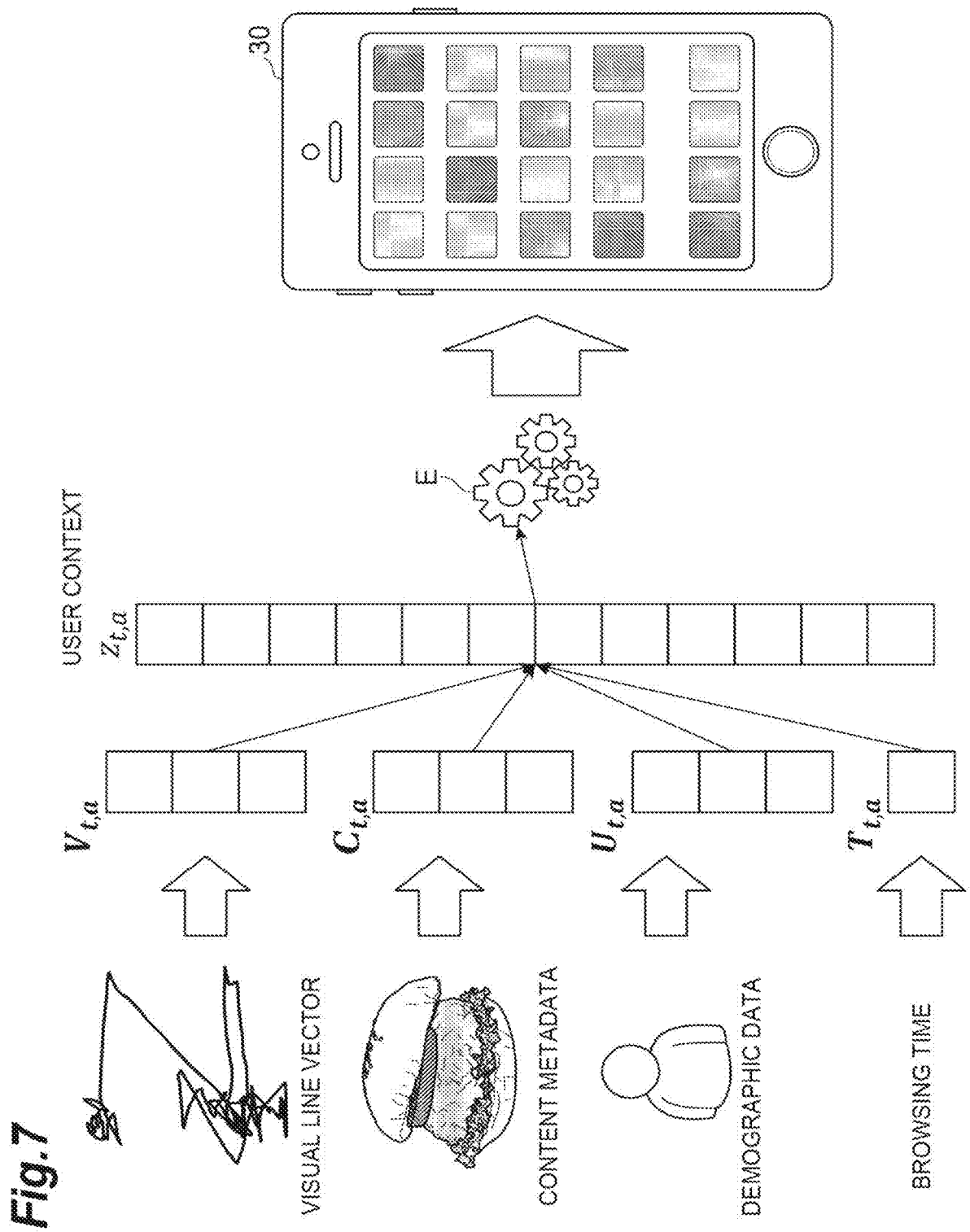
FIG. 7 is a diagram describing an outline of a recommendation based on the visual line vector.

FIG. 7 is a diagram illustrating the outline of the recommendation based on the visual line vector. For example, the generation unit 14 generates the user context $z_{t,a}$ by combining the visual line vector $V_{t,a}$, the content metadata $C_{t,a}$, the demographic data $U_{t,a}$, and the browsing time $T_{t,a}$. The computation unit 15 computes the score of each of the plurality of contents, which are the recommendation candidates, by using the user context. In addition, the computation unit 15 learns the user context $z_{t,a}$ in the computation of the score using a learning model E (for example, the contextual bandit algorithm). The output unit 16 selects one or a plurality of contents from the plurality of contents in descending order of the score, and transmits the recommendation result of the selected content to the user terminal 30. The user terminal 30 displays the received recommendation result.

Figure 8:
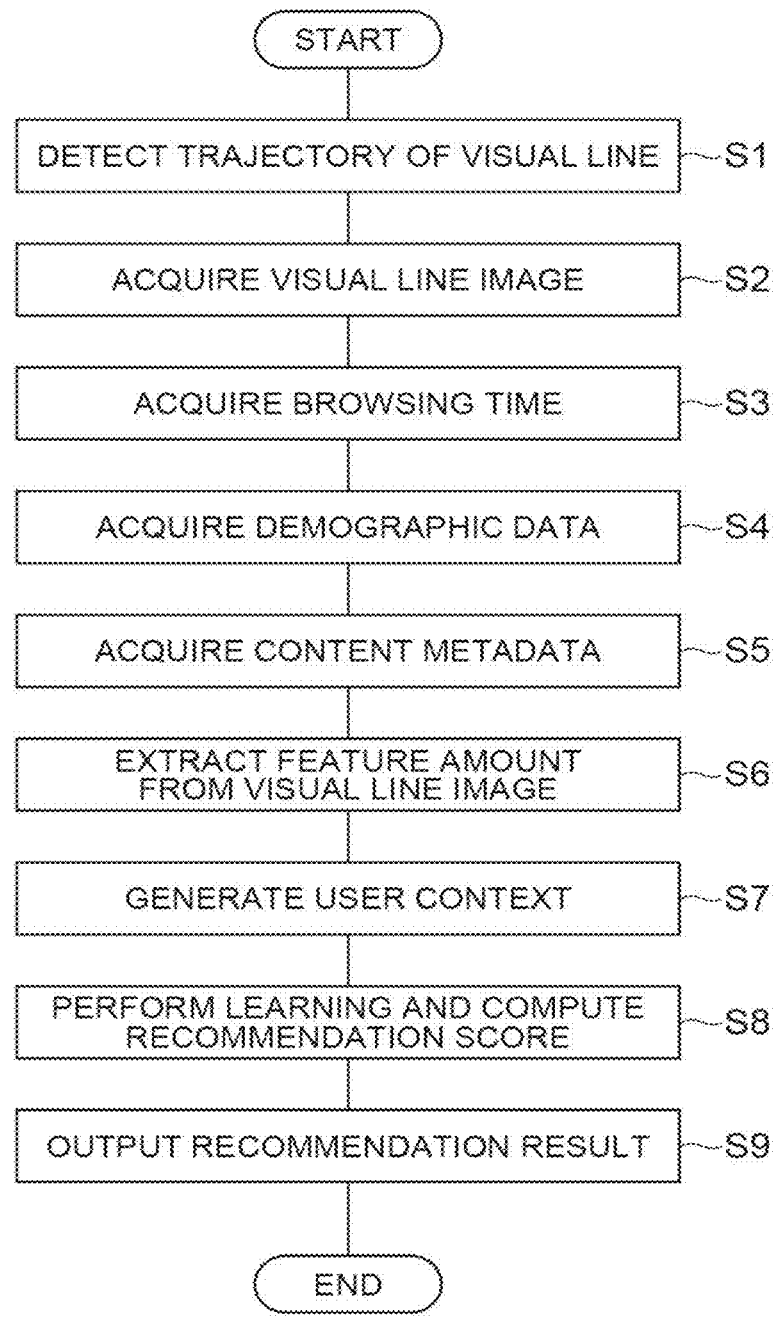
FIG. 8 is a flowchart illustrating processing executed by the recommendation device.

Next, processing executed by the recommendation system 1 will be described by using a flowchart illustrated in FIG. 8.

The user terminal 30 detects the trajectory of the visual line of the user (step S1). The user terminal 30 detects the trajectory V of the visual line of the user with respect to the content while displaying the product details screen G illustrated in FIG. 3. The user terminal 30 transmits the information indicating the detected trajectory V of the visual line to the recommendation device 10.

The acquisition unit 12 acquires the visual line image obtained by imaging the trajectory of the visual line of the user browsing the content displayed on the user terminal 30 (step S2). For example, the acquisition unit 12 acquires the visual line image VP obtained by imaging the trajectory V of the visual line with the visual line image generation unit 11.

The acquisition unit 12 acquires the browsing time for browsing the content (step S3). For example, the acquisition unit 12, for example, acquires the browsing time Tia for which the content is browsed by the user on the basis of the information indicating the trajectory V of the visual line, which is received from the user terminal 30.

The acquisition unit 12 acquires the demographic data of the user (step S4). For example, the acquisition unit 12 acquires the demographic data $U_{t,a}$ of the user, which is stored in the storage unit 2.

The acquisition unit 12 acquires the content metadata of the user (step S5). For example, the acquisition unit 12 acquires the content metadata $C_{t,a}$ of the user, which is stored in the storage unit 2.

The extraction unit 13 extracts the feature vector (the visual line vector) indicating the feature amount of the visual line image (step S6). For example, the extraction unit 13 generates the numerical data obtained by featurizing the visual line image. Then, the extraction unit 13 performs the main component analysis with respect to the numerical data to extract the first main component as the visual line vector. In an example, the extraction unit 13 generates the numerical data VA obtained by featurizing the visual line image VP (refer to FIG. 4). In addition, the extraction unit 13 performs the main component analysis with respect to the numerical data VA to extract the first main component as the visual line vector $V_{t,a}$ (refer to FIG. 5).

The generation unit 14 generates the correspondence relationship between the content and the trajectory of the visual line of the user as the user context on the basis of the visual line vector, which is the feature vector (step S7). For example, the generation unit 14 generates the user context $z_{t,a}$ by combining the visual line vector $V_{t,a}$, the content metadata $C_{t,a}$, the demographic data $U_{t,a}$, and the browsing time $T_{t,a}$.

The computation unit 15 computes the score of each of the plurality of contents, which are the recommendation candidates, by using the user context (step S8). In an example, the computation unit 15 computes the score $p_{t,a}$ of the content by Expression (1). In addition, the computation unit 15 learns the user context $z_{t,a}$ in the process of computing the score $p_{t,a}$.

In the processing of step S8, the acquisition unit 12 may further acquire the ground truth data indicating the record that the user purchases the content displayed on the user terminal 30. The computation unit 15 may learn the user context by using the ground truth data in the computation of the score.

The output unit 16 outputs the recommendation result of the content selected on the basis of the score (step S9). For example, the output unit 16 selects one or a plurality of contents from the plurality of contents in descending order the score $p_{t,a}$, and transmits the recommendation result of the selected content to the user terminal 30.

Next, the function effect of the recommendation device 10 according to this embodiment will be described.

The recommendation device 10 according to this embodiment includes the acquisition unit 12 acquiring the visual line image obtained by imaging the trajectory of the visual line of the user browsing the content displayed on the user terminal 30, the extraction unit 13 extracting the feature vector indicating the feature amount of the visual line image, the generation unit 14 generating the correspondence relationship between the content and the trajectory of the visual line of the user as the user context on the basis of the feature vector, the computation unit 15 computing the score of each of the plurality of contents, which are the recommendation candidates, by using the user context, and the output unit 16 outputting the recommendation result of the content selected on the basis of the score.

In the recommendation device 10 according to this embodiment, the feature vector indicating the feature amount of the trajectory of the visual line of the user browsing the content is extracted by featurizing the visual line image. Then, the correspondence relationship between the content and the trajectory of the visual line of the user is generated as the user context on the basis of the feature vector. Further, the score of each of the contents is computed on the basis of such a user context, and the recommendation result is output. By imaging the trajectory of the visual line and computing the score of each of the contents without determining what the user has been watching (for example, which information such as a price or product details, which is the information of the content, the user has been watching), it is possible to abstractively grasp the preference of the user on the basis of the behavior. According to such a method for grasping the preference, it is not necessary to determine the preference of the user relevant to the information of the content (for example, the price, the product details, and the like) by determining what the user has been watching. Then, the content according to the trajectory of the visual line of the user can be selected in accordance with the score based on the visual line image. As a result thereof, it is possible to recommend the content matching the preference of the user.

Note that, the processing of the recommendation device 10 can be referred to as reinforcement learning based on the trajectory of the visual line. Since such reinforcement learning can be performed on the premise that a different trajectory of the visual line occurs for each of the contents, it is easier to grasp the individual personality compared to an algorithm simply using the visual line. By using the reinforcement learning, the recommendation device 10 is also capable of managing a problem of not grasping which trajectory of the visual line leads to which preference of the user.

In the recommendation device 10 described above, the acquisition unit 12 further acquires the content metadata that is the meta-information of the content browsed finally by the user, the browsing time for browsing the content, and the demographic data of the user. The generation unit 14 generates the correspondence relationship between the content and the trajectory of the visual line of the user as the user context on the basis of the feature vector, the content metadata, the demographic data, and the browsing time. The content metadata, the demographic data, and the browsing time are reflected on the user context in addition to the feature vector. Then, the score of each of the contents is computed on the basis of such a user context, and the recommendation result is output. By reflecting the characteristic of the user on the recommendation result, the content according to the preference of the user easily appears in the recommendation result.

In the recommendation device 10 described above, the acquisition unit 12 further acquires the ground truth data indicating the record that the user purchases the content displayed on the user terminal 30. The computation unit 15 learns the user context by using the ground truth data in the computation of the score. The ground truth data is reflected on the user context, in addition to the feature vector. Then, the score of each of the contents is computed on the basis of such a user context, and the recommendation result is output. By reflecting the ground truth data on the recommendation result, the content according to the preference of the user easily appears in the recommendation result.

Modification Example

In the embodiment described above, it has been described that in the numerical value of each of the elements of the numerical data VA illustrated in FIG. 4, the position of the information relevant to the content is not considered, but the extraction unit 13 may generate the numerical data by considering the position of the information relevant to the content. For example, the extraction unit 13 may divide the visual line image into regions in which the visual line image and the information relevant to the content (for example, the product image C1, the product price C2, the detailed statement C3, the collateral information C4, and the like) are associated with each other, and acquire the feature amount in each of the divided regions. Alternatively, the acquisition unit 12 may further acquire the position of the information relevant to the content from the user terminal 30. Then, the generation unit 14 may generate the correspondence relationship between the content and the trajectory of the visual line of the user as the user context on the basis of the feature vector, the content metadata, the demographic data, the browsing time, and the position of the information relevant to the content. According to such processing, the position of the information relevant to the content is reflected on the user context. The computation unit 15 may further learn the user context on which the position of the information relevant to the content is reflected in the computation of the score.

In the embodiment described above, the user terminal 30 transmits the detected trajectory V of the visual line to the recommendation device 10, but the user terminal 30 may transmit the visual line image obtained by imaging the detected trajectory V of the visual line to the recommendation device 10. In this case, the recommendation device 10 receives the visual line image obtained by imaging the trajectory V of the visual line.

Note that, a block diagram used for the description of the above embodiment illustrates the blocks of function units. Such function blocks (configuration units) are attained by any combination of at least one of hardware and software. In addition, a method for attaining each of the function blocks is not particularly limited. That is, each of the function blocks may be attained by using one physically or logically coupled device, or may be attained by using a plurality of devices obtained by directly or indirectly (for example, in a wired or wireless manner) connecting two or more devices physically or logically separated from each other. The function block may be attained by combining software with the one device or the plurality of devices.

The function includes determining, judging, calculating, computing, processing, deriving, investigating, searching, ascertaining, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, and the like, but is not limited thereto. For example, the function block (the configuration unit) performing the transmitting is referred to as a transmitting unit or a transmitter. In either case, as described above, a method for attaining the function block is not particularly limited.

Figure 9:
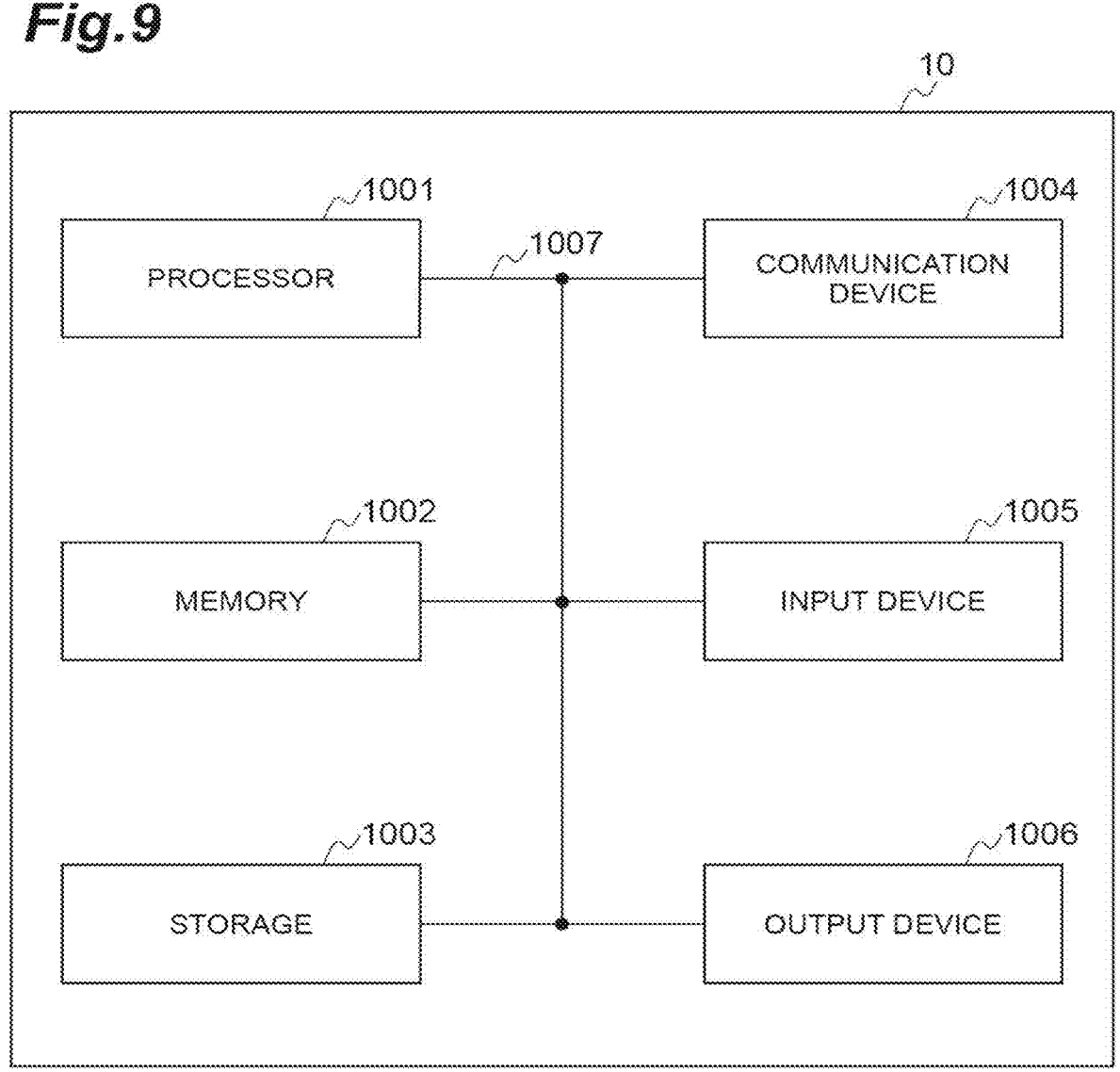
FIG. 9 is a diagram illustrating a hardware configuration of the recommendation device.

For example, the recommendation device 10 in one embodiment of the present disclosure may function as a computer performing information processing of the present disclosure. FIG. 9 is a diagram illustrating an example of a hardware configuration of the recommendation device 10 according to one embodiment of the present disclosure. The recommendation device 10 described above may be physically configured as a computer device including a processor 1001, a memory 1002, a storage 1003, a communication device 1004, an input device 1005, an output device 1006, a bus 1007, and the like. In addition, a hardware configuration of the user terminal 30 may also be the same as described herein.

Note that, in the following description, the word "device" can be replaced with a circuit, a unit, or the like. The hardware configuration of the recommendation device 10 may be configured to include one or a plurality of devices illustrated in the drawings, or configured to exclude some devices.

Each of the functions in the recommendation device 10 is attained by reading predetermined software (program) on the hardware such as the processor 1001 and the memory 1002 such that the processor 1001 performs arithmetic, and controlling the communication of the communication device 1004 or controlling at least one of the reading and the writing of data in the memory 1002 and the storage 1003.

The processor 1001, for example, controls the entire computer by operating an operating system. The processor 1001 may be composed of a central processing unit (CPU) including an interface with a peripheral device, a control device, an arithmetic device, a register, and the like. For example, each of the functions in the recommendation device 10 described above may be attained by the processor 1001.

In addition, the processor 1001 reads out a program (a program code), a software module, data, and the like from at least one of the storage 1003 and the communication device 1004 to the memory 1002, and executes various processing pieces in accordance with the program and the like. As the program, a program for allowing a computer to execute at least a part of the operation described in the above embodiment is used. For example, each of the functions in the recommendation device 10 may be attained by a control program that is stored in the memory 1002 and operated in the processor 1001. It has been described that the various processing pieces described above are executed by one processor 1001, but the various processing pieces may be simultaneously or sequentially executed by two or more processors 1001. The processor 1001 may be implemented by one or more chips. Note that, the program may be transmitted from a network via an electric communication line.

The memory 1002 is a computer-readable recording medium, and for example, may be composed of at least one of a read only memory (ROM), an erasable programmable ROM (EPROM), an electrically erasable programmable ROM (EEPROM), a random access memory (RAM), and the like. The memory 1002 may be referred to as a register, a cache, a main memory (a main storage device), and the like. The memory 1002 may store a program (a program code), a software module, and the like that can be executed to carry out the information processing according to one embodiment of the present disclosure.

The storage 1003 is a computer-readable recording medium, and for example, may be composed of at least one of an optical disk such as a compact disc ROM (CD-ROM), a hard disk drive, a flexible disk, a magnetooptic disk (for example, a compact disk, a digital versatile disk, and a Blu-ray (Registered Trademark) disk), a smart card, a flash memory (for example, a card, a stick, and a key drive), a floppy (Registered Trademark) disk, a magnetic strip, and the like. The storage 1003 may be referred to as an auxiliary storage device. A storage medium provided in the recommendation device 10, for example, may be a database, a server, and other suitable media including at least one of the memory 1002 and the storage 1003.

The communication device 1004 is hardware (a transmitting and receiving device) for performing communication with respect to a computer via at least one of a wired network and a wireless network, and for example, is also referred to as a network device, a network controller, a network card, a communication module, and the like.

The input device 1005 is an input device (for example, a keyboard, a mouse, a microphone, a switch, a button, a sensor, and the like) receiving input from the outside. The output device 1006 is an output device (for example, a display, a speaker, an LED lamp, and the like) carrying out output to the outside. Note that, the input device 1005 and the output device 1006 may have an integrated configuration (for example, a touch panel).

In addition, each of the devices such as the processor 1001 and the memory 1002 is connected by the bus 1007 for performing the communication of the information. The bus 1007 may be configured by using a single bus, or may be configured by using different buses for each of the devices.

In addition, the recommendation device 10 may be configured by including hardware such as a microprocessor, a digital signal processor (DSP), an application specific integrated circuit (ASIC), a programmable logic device (PLD), and a field programmable gate array (FPGA), and a part or all of each of the function blocks may be attained by the hardware. For example, the processor 1001 may be implemented by using at least one of the hardware.

The order of the processing procedure, the sequence, the flowchart, and the like of each of the aspects/embodiments described in the present disclosure may be changed unless there is contradiction. For example, in the method described in the present disclosure, the elements of various steps are presented by using an exemplary order, but the present disclosure is not limited to the presented specific order.

The input and output information or the like may be stored in a specific place (for example, a memory), or may be managed by using a management table. The input and output information or the like can be overwritten, updated, or edited. The output information or the like may be deleted. The input information or the like may be transmitted to other devices.

The judging may be performed by a value represented by 1 bit (0 or 1), may be performed by a truth value (Boolean: true or false), or may be performed by comparing numerical values (for example, comparing with a predetermined value).

Each of the aspects/embodiments described in the present disclosure may be used alone, may be used in combination, or may be used by being switched in accordance with the execution. In addition, the notifying of predetermined information (for example, the notifying of "X") is not limited to being performed explicitly, but may be performed implicitly (for example, by not performing the notifying of the predetermined information).

The present disclosure has been described in detail, but it is obvious to a person skilled in the art that the present disclosure is not limited to the embodiment described in the present disclosure. The present disclosure can be carried out as modifications and variations without departing from the spirit and the scope of the present disclosure defined by the claims. Therefore, the description of the present disclosure is for illustrative purpose and is not intended to have any restrictive meaning on the present disclosure.

The software should be broadly construed to indicate an instruction, an instruction set, a code, a code segment, a program code, a program, a sub-program, a software module, an application, a software application, a software package, a routine, a sub-routine, an object, an executable file, an execution thread, a procedure, a function, and the like, regardless of being referred to as software, firmware, middleware, a microcode, and a hardware description language, or referred to as other names.

In addition, the software, the instruction, the information, and the like may be transmitted and received via a transmission medium. For example, in a case where the software is transmitted from a website, a server, or other remote sources by using at least one of a wired technology (a coaxial cable, an optical fiber cable, a twisted pair, a digital subscriber line (DSL), and the like) and a wireless technology (an infrared ray, a microwave, and the like), at least one of the wired technology and the wireless technology is included in the definition of the transmission medium.

The terms "system" and "network" used in the present disclosure are used interchangeably.

In addition, the information, the parameter, and the like described in the present disclosure may be represented by using an absolute value, may be represented by using a relative value from a predetermined value, or may be represented by using another corresponding information.

The term "determining" used in the present disclosure may include various operations. "Determining", for example, may include considering judging, calculating, computing, processing, deriving, investigating, looking up, searching, inquiring (for example, looking up, searching, or inquiring in a table, a database, or another data structure), and ascertaining as "determining". In addition, "determining" may include considering receiving (for example, receiving information), transmitting (for example, transmitting information), input, output, and accessing (for example, accessing data in a memory) as "determining". In addition, "determining" may include considering resolving, selecting, choosing, establishing, comparing, and the like as "determining". That is, "determining" may include "determining" any operation. In addition, "determining" may be replaced with "assuming", "expecting", "considering", and the like.

The terms "connected" and "coupled", or any variations thereof indicate any direct or indirect connection or coupling between two or more elements, and may include one or more intermediate elements between two elements "connected" or "coupled" to each other. The elements may be coupled or connected to each other physically, logically, or in combination thereof. For example, "connecting" may be replaced with "accessing". In a case where the terms are used in the present disclosure, it can be considered that two elements are "connected" or "coupled" to each other by using at least one of one or more electric wires, cables, and printed electric connections, and as several non-determinative and non-inclusive examples, by using electromagnetic energy or the like having a wavelength in a wireless frequency region, a microwave region, and a light (both of visible and non-visible) region.

The expression "on the basis of" used in the present disclosure does not indicate "only on the basis of" unless explicitly stated otherwise. In other words, the expression "on the basis of" indicates both of "only on the basis of" and "at least on the basis of".

Any reference to the elements using the addresses "first", "second", and the like used in the present disclosure does not generally limit the amount or the order of the elements. Such addresses can be used in the present disclosure as a convenient method for distinguishing two or more elements. Therefore, the reference to the first and second elements does not indicate that only two elements can be adopted or the first element necessarily precedes the second element in any way.

In the present disclosure, in a case where "include", "including", and variations thereof are used, such terms are intended to be inclusive as with the term "comprising". Further, the term "or" used in the present disclosure is intended not to be exclusive OR.

In the present disclosure, for example, in a case where articles are added by translation, such as a, an, and the in English, the present disclosure may include that the nouns following such articles are in a plural form.

In the present disclosure, the term "A and B are different" may indicate that "A and B are different from each other". Note that, the term may indicate that "each of A and B is different from C". The terms "separated", "coupled", and the like may be construed as with "different".

REFERENCE SIGNS LIST

10: recommendation device, 11: visual line image generation unit, 12: acquisition unit, 13: extraction unit, 14: generation unit, 15: computation unit, 16: output unit, 21: demographic data, 30: user terminal.

The invention claimed is:

1. A recommendation device, comprising: circuitry configured to acquire a visual line image obtained by imaging a trajectory of a visual line of a user on a screen for each access to the screen while browsing a content displayed on a user terminal; extract a feature vector indicating a feature amount of the visual line image; generate a correspondence relationship between the content and the trajectory of the visual line of the user as a user context on the basis of the feature vector; compute a score of each of a plurality of contents, which are recommendation candidates, by using the user context; and output a recommendation result of a content selected on the basis of the score, wherein the circuitry further acquires content metadata that is meta-information of a content browsed finally by the user, demographic data of the user, and a browsing time for browsing the content, and generates the correspondence relationship between the content and the trajectory of the visual line of the user as the user context on the basis of the feature vector, the content metadata, the demographic data, and the browsing time.

2. The recommendation device according to claim 1, wherein the circuitry further
acquires ground truth data indicating a record that the user purchases the content displayed on the user terminal, and
learns the user context by using the ground truth data in the computation of the score.

3. The recommendation device according to claim 1 wherein the circuitry further acquires ground truth data indicating a record that the user purchases the content displayed on the user terminal, and learns the user context by using the ground truth data in the computation of the score.

4. A method implemented by circuitry of a recommendation device, comprising: acquiring a visual line image obtained by imaging a trajectory of a visual line of a user on a screen for each access to the screen while browsing a content displayed on a user terminal; extracting a feature vector indicating a feature amount of the visual line image; generating a correspondence relationship between the content and the trajectory of the visual line of the user as a user context on the basis of the feature vector; computing a score of each of a plurality of contents, which are recommendation candidates, by using the user context; and outputting a recommendation result of a content selected on the basis of the score wherein the method further includes acquiring content metadata that is meta-information of a content browsed finally by the user, demographic data of the user, and a browsing time for browsing the content, and generating the correspondence relationship between the content and the trajectory of the visual line of the user as the user context on the basis of the feature vector, the content metadata, the demographic data, and the browsing time.

* * * * *